(No Model.)
R. F. FOWLER.
CLOTHES LINE REEL AND HOUSE.
No. 337,758. Patented Mar. 9, 1886.
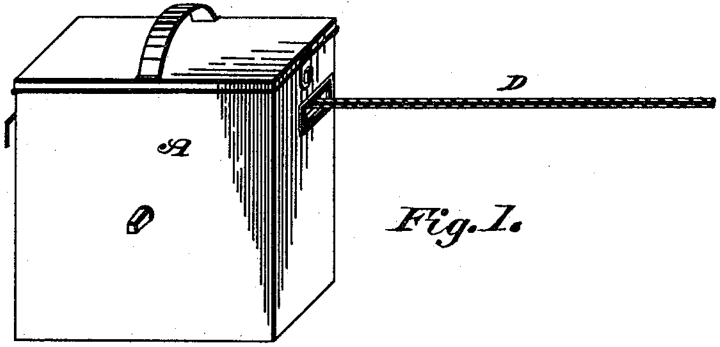
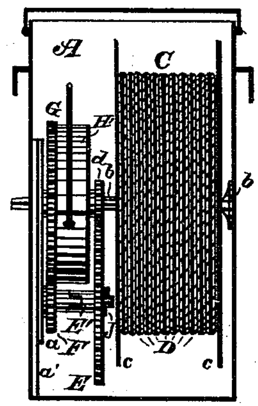
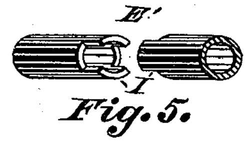
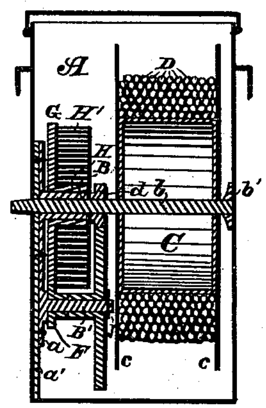
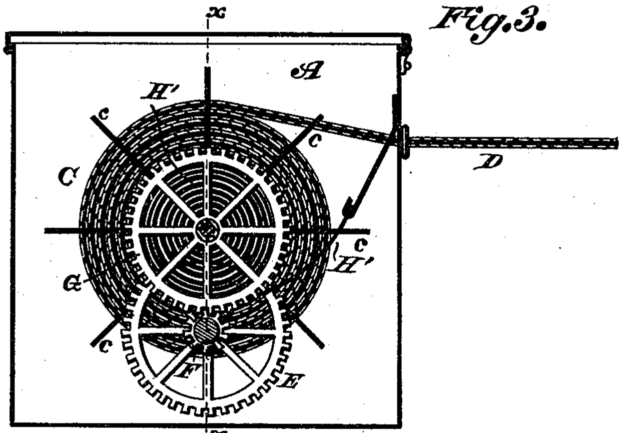
WITNESSES:
Harry Frease.
Chas. A. Rese,
INVENTOR
Robert F. Fowler
BY Fred W. Bond
ATTORNEY
N. PETERS. Photo-Lithographer. Washington, D. C.

UNITED STATES PATENT OFFICE.

ROBERT F. FOWLER, OF CANTON, OHIO, ASSIGNOR OF ONE-HALF TO CHARLES A. REX, OF SAME PLACE.

CLOTHES-LINE REEL AND HOUSE.

SPECIFICATION forming part of Letters Patent No. 337,758, dated March 9, 1886.

Application filed April 13, 1885. Serial No. 161,997. (No model.)

*To all whom it may concern:*

Be it known that I, ROBERT F. FOWLER, a citizen of the United States, residing at Canton, in the county of Stark and State of Ohio, have invented certain new and useful Improvements in Clothes-Line Reels and Houses, of which the following is a full, clear, and exact description of the same, reference being had to the annexed drawings, in which—

Figure 1 is a perspective view of the house, the interior mechanism being concealed. Fig. 2 is an end view showing the general construction and arrangement of my improved reel. Fig. 3 is a sectional view on line *x x*, Fig. 4. Fig. 4 is a side view showing the side of the house removed and a portion of line wound on the reel. Fig. 5 is a detached view of shaft.

The present invention has relation to the general improvement of clothes-line reels; and its nature consists in the different parts and combination of parts hereinafter described, and particularly pointed out in the claims.

Similar letters of reference indicate corresponding parts in all the figures of the drawings.

In the accompanying drawings, A represents the house or casing, which may be substantially of the form shown in Fig. 1, and is held at the required height by a post or any other desired means. The house may be made of sheet metal or any other suitable material. Within this house are located all the different parts of the reel proper. The metal plate *a* is attached to the wood plate *a'*, and are both securely attached to the side of the house A, as shown in Figs. 2 and 3. To the metal plate are securely attached the hollow bearing B and the post B'. The bearing B is for the purpose of receiving one end of the reel-shaft *b*, the opposite end turning in the bearing *b'*. To the reel-shaft is attached the reel C, as shown in the drawings. Said reel is provided with the arms *c*, which are for the purpose of holding the line D in proper position. Flanges or collars may be placed on the ends of the reel, if desired. To the reel-shaft is rigidly attached the pinion *d*, which meshes in the wheel E. Said wheel E is rigidly attached to the short shaft E', and to the short shaft E' is rigidly attached the pinion F, which meshes in the wheel G, as seen in Figs. 2 and 3. To the wheel G is rigidly attached the thimble H, which, together with the wheel G, revolves on the hollow bearing B, said bearing acting as a bearing for the reel-shaft *b* and the thimble H. The inner end of the coiled spring H' is attached to the thimble H, and the outer end is secured to the case A.

For the purpose of conveniently casting the short shaft E', and the pinion F, and the wheel E, I form said shaft in two pieces and join them by the clutch I, as seen in Fig. 2, which form the shaft E', as seen in said Fig. 2, all of said parts being securely held on the post B' by the pin J.

It will be seen that by my novel and peculiar arrangement the line D will be drawn into the house A by means of the spring H' at all times when the line is loosened. To the outer end of the line D should be attached a ring, to prevent the end of the line from being drawn into the house A. The reel-shaft *b* extends out from the house A a short distance, as shown in Fig. 1, and is for the purpose of winding up the spring before placing or attaching the line D to the reel C.

Having now fully described my invention, what I claim as new, and desire to secure by Letters Patent, is—

1. The combination, with the metal plate *a*, provided with the hollow bearing B and the post B', of the reel-shaft *b*, having attached thereto the reel C and the pinion *d*, and the gears E, F, and G, all arranged substantially as shown and described, and for the purpose specified.

2. The house A, having located therein the reel C, the shaft *b*, carrying the reel, the pinion *d*, gear-wheel E, sectional shaft E', bearing B, thimble H, spring H', and gears F and G, substantially as described.

In testimony that I claim the above I have hereunto subscribed my name in the presence of two witnesses.

ROBERT F. FOWLER.

Witnesses:
WM. J. FOWLER,
CHAS. A. REX.